(12) United States Patent
Britt et al.

(10) Patent No.: US 6,615,042 B1
(45) Date of Patent: Sep. 2, 2003

(54) METHOD OF HANDLING SUBSCRIBER SERVICES IN A WIRELESS INTELLIGENT NETWORK

(75) Inventors: Margaret Britt, Pointe-Claire (CA); Pietro Fionda, St-Leonard (CA); Hanh Duy Vo, St-Laurent (CA); Phat M. Nguyen, Montreal (CA); Binh Nguyen, Ville St-Laurent (CA); Susan Anctil, Dorval (CA); Giuseppe Bruzzese, St-Leonard (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 567 days.

(21) Appl. No.: 09/610,135

(22) Filed: Jul. 5, 2000

Related U.S. Application Data

(60) Provisional application No. 60/150,482, filed on Aug. 24, 1999.

(51) Int. Cl.[7] .................................................. H04Q 7/20
(52) U.S. Cl. ........................ 455/433; 455/435; 455/461; 455/445; 379/221.08; 379/221.09; 379/201.02; 379/207.12
(58) Field of Search ................................. 455/432, 435, 455/433, 461, 445; 379/201.01, 201.02, 201.12, 207.02, 221.08, 1, 221.12, 230

(56) References Cited

U.S. PATENT DOCUMENTS 6,167,064 A * 12/2000 Cohn et al. ................. 370/522
6,181,935 B1 * 1/2001 Gossman et al. ............ 455/433
6,393,269 B1 * 5/2002 Hartmaier et al. .......... 455/406
6,434,126 B1 * 8/2002 Park .......................... 370/328

FOREIGN PATENT DOCUMENTS

WO      WO 99/51040      10/1999

* cited by examiner

Primary Examiner—William Trost
Assistant Examiner—Danh C Le
(74) Attorney, Agent, or Firm—Smith & Danamraj, P.C.

(57) ABSTRACT

A method in a Wireless Intelligent Network (WIN) of handling subscriber services when a serving Mobile Switching Center (MSC) does not support all WIN triggers. The WIN includes a Home Location Register (HLR) having a subscriber profile that indicates the WIN triggers required to support a particular subscriber's active services. When an invoke message is sent from the MSC to the HLR, a WIN Capabilities (WINCAP) parameter is included and indicates the WIN triggers supported by the MSC. The HLR identifies a Service Control Point (SCP) for each subscriber service that requires a WIN trigger and is not supported by the MSC. The HLR then queries each identified SCP for call-treatment instructions. If an SCP determines that its service is essential, a response is returned to the HLR with an instruction to deny service to the subscriber. If an SCP determines that its service is not essential, a response is returned to the HLR with an instruction to skip the unsupported service and allow basic services to the subscriber. The HLR collates the responses and determines a call-treatment response to return to the MSC.

14 Claims, 4 Drawing Sheets

METHOD OF HANDLING SUBSCRIBER SERVICES IN A WIRELESS INTELLIGENT NETWORK

PRIORITY STATEMENT UNDER 35 U.S.C. § 119(e) & 37 C.F.R. § 1.78

This nonprovisional application claims priority based upon the prior U.S. provisional patent application entitled, "Method of Handling Subscriber Services in a Wireless Intelligent Network", application No. 60/150,482, filed Aug. 24, 1999, in the names of Margaret Britt, Pietro Fionda, Hanh Duy Vo, Phat M. Nguyen, Binh Nguyen, Susan Anctil, and Giuseppe Bruzzese.

BACKGROUND OF THE INVENTION

1. Technical Field of the Invention

This invention relates to telecommunication systems and, more particularly, to a method in a Wireless Intelligent Network (WIN) of handling subscriber services when a serving Mobile Switching Center (MSC) does not support all WIN triggers.

2. Description of Related Art

In Wireless Intelligent Networks, services are triggered by various triggering events. The triggers are independent of the services they support—one trigger may be used for many services. Therefore, a service cannot be definitely ascertained from a trigger. When a subscriber signs up for WIN services, his subscriber profile in his Home Location Register (HLR) is supplied with the WIN triggers required to support his services. Thus, the HLR knows that the subscriber has WIN services, but does not know the specific services to which he subscribes.

A problem arises when a WIN subscriber roams into an MSC (or is reached from a Roamer Port on an MSC) that does not support WIN triggers (or at least one of the WIN triggers contained in the subscriber profile in the HLR). In some cases, such as when the subscriber has a non-essential service (for example, the WIN Abbreviated Dialing service), it may be desirable to allow the subscriber to "fall back" to a more basic set of capabilities, rather than to deny access, so that the subscriber can continue to place and receive calls. Some subscribers, however, may subscribe to services which are deemed essential, such as a prepaid service. WIN Prepaid is a service in which a prepaid account is set up, and the account is then debited for the charges for each call made to or from the Prepaid subscriber. The subscriber's serving MSC must support the WIN Prepaid service in order for the prepaid account to be properly debited. In such cases, therefore, it may be preferable to bar the subscriber from placing or receiving calls since all calls to and from that subscriber would circumvent the Prepaid account debiting system.

Neither the MSC nor the HLR have the information required to distinguish between these two types of cases, and the published WIN standard, IS-771, does not address the issue clearly. The standard states that the HLR should not send triggers to an MSC that does not support them, but it does not state whether the MSC should allow other services that are supported, or deny access in this case. Additionally, IS-771 does not indicate what behavior is expected of the HLR when an MSC that does not support all WIN triggers sends a query to the HLR (for example, a Location Request) that would normally require the HLR to respond with a Trigger Address List.

Proposed versions of the standard suggest that the HLR should determine whether the MSC supports a set of triggers that are critical to delivering WIN service in the serving system. If so, then the Trigger Address List should be sent to the MSC. If not, the standard merely states that the HLR should consider restricting originations and terminations. There is no definition of "critical" triggers nor any suggestion of expected MSC behavior. This approach implies that the HLR should infer the services based on the triggers, but as noted above, a service cannot be definitely ascertained from a trigger since one trigger may be used for many services.

Thus, there is no existing or proposed solution to the problems encountered when a WIN subscriber roams into an MSC that does not support all WIN triggers.

SUMMARY OF THE INVENTION

In one aspect, the present invention is a method in a Wireless Intelligent Network (WIN) of handling subscriber services when a serving Mobile Switching Center (MSC) does not support all WIN triggers. The WIN includes a Home Location Register (HLR) having a subscriber profile that indicates the WIN triggers required to support a particular subscriber's active WIN services. The method includes the steps of sending from the MSC to the HLR, an indication of the WIN triggers supported by the MSC; identifying by the HLR, the WIN triggers in the profile that are not supported by the MSC; and identifying for each WIN trigger in the profile that is not supported by the MSC, an associated service-providing entity in the network. The HLR then queries each identified service-providing entity for call-treatment instructions which are then sent from the service-providing entities to the HLR. This is followed by the steps of determining by the HLR, a call-treatment response; and sending the call-treatment response to the MSC.

Each service-providing entity may determine whether its associated unsupported service is an essential service, may prepare call-treatment instructions to allow a reduced set of services upon determining that its associated unsupported service is not an essential service, or may prepare call-treatment instructions to deny service upon determining that its associated unsupported service is an essential service.

In another aspect, the present invention is a method in a WIN of handling subscriber services when the serving MSC does not support a particular WIN trigger (Trigger X) which supports a plurality of WIN services. The HLR includes a database that associates WIN triggers with Service Control Points (SCPs), and a first SCP (SCP1) includes a Service Interaction Manager (SM) for Trigger X. The method includes the steps of sending from the MSC to the HLR, an indication that the MSC does not support Trigger X. The HLR identifies SCP1 as the SCP associated with Trigger X, and queries SCP1 for call-treatment instructions. SCP1 then identifies an SCP associated with each of the plurality of WIN services supported by Trigger X, and queries each identified SCP for call-treatment instructions related to each SCP's associated WIN service. Each SCP then sends call-treatment instructions to SCP1 which determines a call-treatment response. The call-treatment response is then sent from SCP1 to the HLR, and from the HLR to the MSC.

In yet another aspect, the method of the present invention may be performed entirely within the HLR. The method includes the steps of receiving in the HLR, an indication of the WIN triggers supported by the MSC; identifying by the HLR, the WIN triggers in the subscriber profile that are not supported by the MSC; and identifying by the HLR, a service-providing entity in the network associated with each WIN trigger in the profile that is not supported by the MSC. The HLR then queries each identified service-providing entity for call-treatment instructions. When call-treatment instructions are received in the HLR from the service-providing entities, the HLR determines a call-treatment response, and sends the call-treatment response to the MSC.

In an alternative embodiment, the method of the present invention begins by populating a database in the HLR with a plurality of call-treatment responses. Each of the responses is associated with a different set of WIN triggers, and is determined prior to receiving from one of the MSCs in the network, an indication of the set of WIN triggers that are supported by the MSC. When an invoke message is received in the HLR with an indication of the set of WIN triggers that are supported by the MSC, the HLR identifies a call-treatment response associated with the set of WIN triggers that are supported by the MSC, and sends the call-treatment response to the MSC.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Currently, when registration occurs in an MSC that supports WIN triggers, an invoke message containing a WiN-Capabilities (WINCAP) parameter describing the MSC's WIN capabilities (i.e., WIN triggers supported) is sent to the HLR. The HLR responds with the triggers that are supportive of the services to which the subscriber subscribes. If the MSC notifies the HLR that it supports no triggers, or only a partial set of triggers, and the HLR knows that some other triggers are involved, the method of the present invention provides logic in the HLR prompting the HLR to query the SCPs (or other entities on which those services are based) to determine whether the unsupported service can be skipped, and a reduced set of services, such as basic services, offered. Alternatively, if the unsupported service is an essential service, it is determined whether even basic services should be denied.

In order to provide a single response to the MSC to either deny access or allow reduced services, the HLR may collect responses from multiple SCPs and then select the strictest response to return to the MSC. For example, one SCP may provide a response that basic services should be offered while another SCP may respond that the subscriber should be denied access. In that case, the HLR defaults to the strictest response, and denies access. A third SCP may be involved, but if its triggers are supported, it is not queried. The HLR only queries SCPs whose services would not be offered because the required triggers are not supported by the serving MSC. If all queried SCPs respond that services should be offered, then basic services are offered, or services are offered based on the triggers that are supported. This process does not require that the MSC or the HLR have any knowledge of what services are involved. They only need to know the triggers, which they already know in the WIN context.

Figure 1:
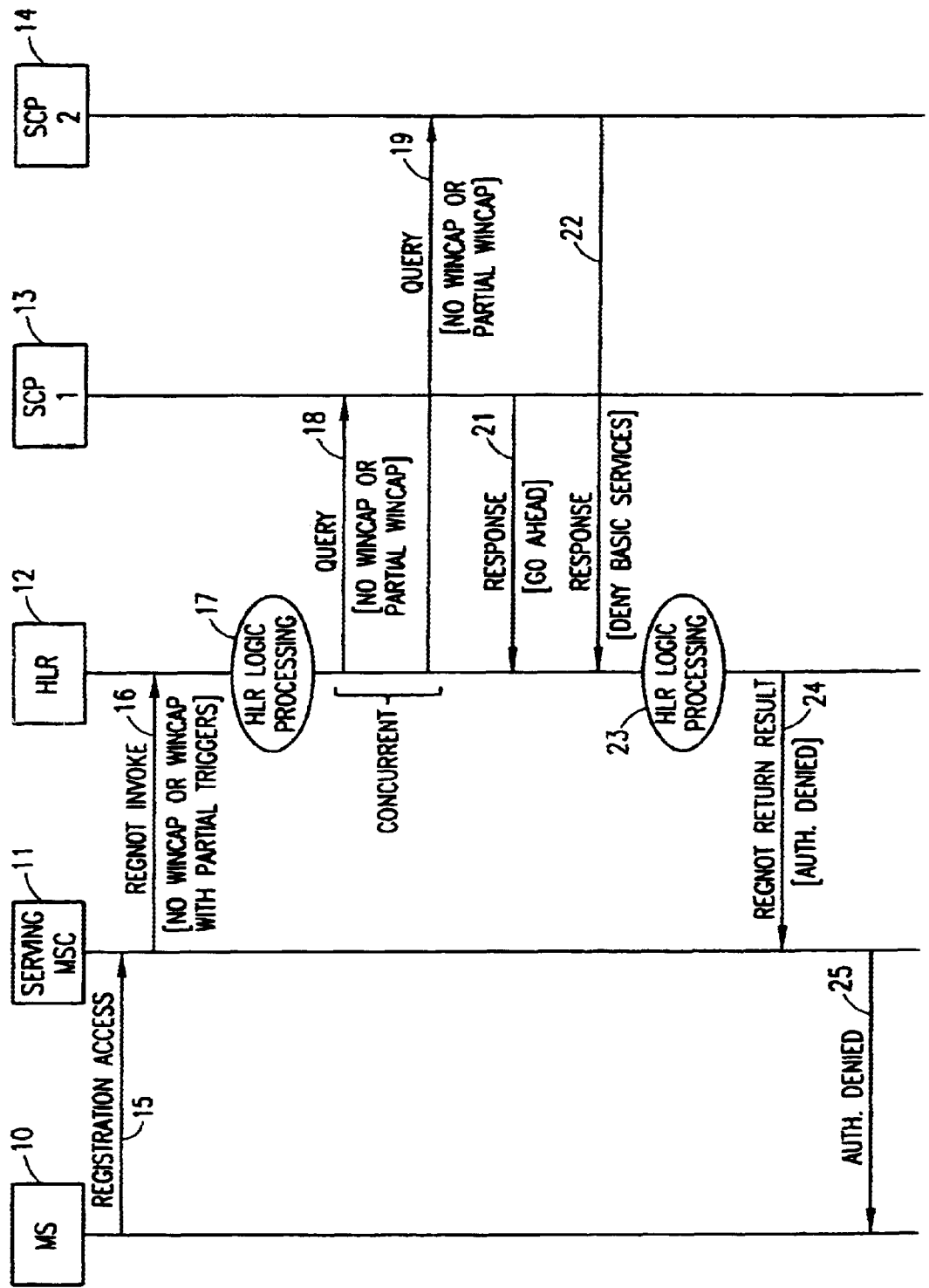
FIG. 1 is a message flow diagram illustrating the steps of the method of the present invention in the context of a mobile station registration, and in which different SCPs return different responses.

FIG. 1 is a message flow diagram illustrating the steps of the method of the present invention in the context of a mobile station registration, and in which different SCPs return different responses. FIG. 1 illustrates the process as performed by an accessing mobile station (MS) 10, a serving MSC 11, an HLR 12, a first SCP (SCP1) 13, and a second SCP (SCP2) 14. When the MS makes a system access at 15, the serving MSC sends a Registration Notification (REGNOT) Invoke message 16 to the HLR associated with the MS, and includes the WINCAP parameter. At 17, the HLR begins its logic processing to determine how to handle this registration access. In the illustrated example, the subscriber profile in the HLR indicates that the subscriber has services built on WIN triggers that are not supported by the MSC capabilities reported in the WINCAP parameter. Therefore, the HLR must determine whether to deny access or offer a basic set of services to the MS. From the WIN trigger profile, the HLR has the addresses of the SCPs that are associated with each trigger. The HLR determines the subset of the SCPs whose services would not be offered due to an unsupported trigger in the serving MSC. In this example, SCP1 and SCP2 would have services that are affected.

The HLR then sends Query messages 18 and 19 to SCP1 and SCP2, respectively. The Query messages may be sent concurrently, and indicate that a subscriber is attempting to register with an MSC that would result in the SCP's service not being offered because the MSC does not support the required trigger(s). The Query includes the WINCAP parameter as received by the HLR from the MSC. Either SCP may be the first to respond to the Query. In this example, SCP1 responds to the HLR at 21 indicating that service logic allows this service to be skipped, and providing a "go-ahead" approval to the HLR to provide basic services to the accessing MS. At 22, however, SCP2 responds to the HLR indicating that the service it supports is an essential service that takes priority over basic services, and therefore, service to the accessing MS should be denied.

At step 23, the HLR 12 continues its logic processing to collate the responses it received from the SCPs and may perform, for example, a simple AND function to determine what response to provide to the serving MSC 11. The HLR then sends a REGNOT Return Result message 24 to the serving MSC and includes an Authorization Denied parameter indicating that service should be denied to the MS by that MSC. Subsequently, the MSC denies service to the MS at 25. The call may then be routed to an announcement or the operator.

The method of the present invention can also be applied to situations involving a roamer port (RP) MSC. In this case, the capabilities of the RP MSC are signaled to the HLR in a Location Request (LOCREQ) Invoke message rather than a REGNOT. The HLR then performs steps 17 through 23 of FIG. 1, and returns a LOCREQ Return Result message to the RP MSC denying service to the subscriber (or allowing basic services) and sending the call to an announcement or the operator.

Figure 2:
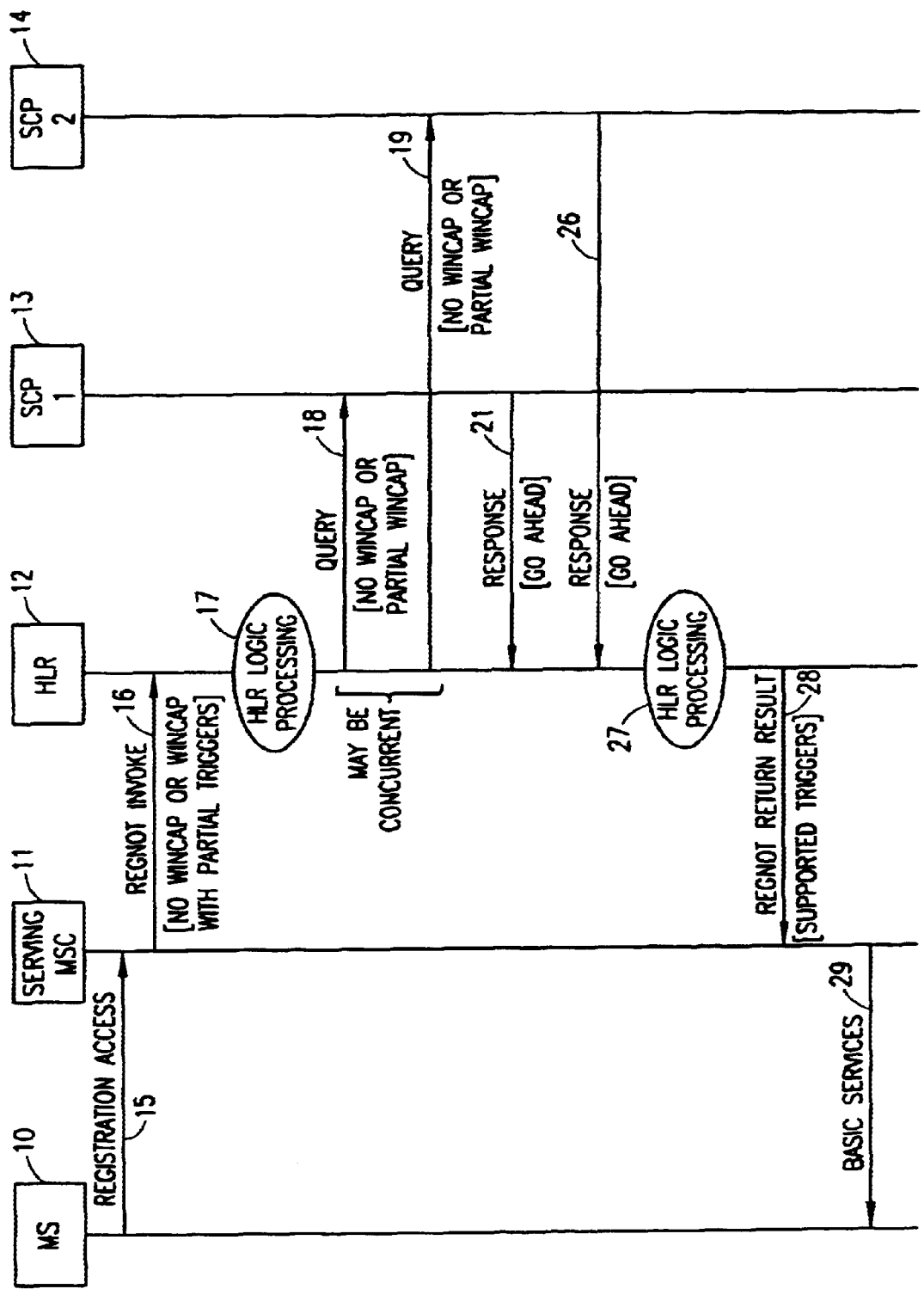
FIG. 2 is a message flow diagram illustrating the steps of the method of the present invention in the context of a mobile station registration, and in which different SCPs return the same response.

FIG. 2 is a message flow diagram illustrating the steps of the method of the present invention in the context of a mobile station registration, and in which different SCPs return the same response. The process is identical to the process illustrated in FIG. 1 until SCP2 returns a response 26 indicating that service logic allows this service to be skipped, and providing a "go-ahead" approval to the HLR to provide basic services to the accessing MS. The HLR logic processing at 27 concludes that basic services should be allowed, and this is indicated to the serving MSC in the REGNOT Return Result message 28. If the REGNOT Invoke message 16 had included a WINCAP parameter indicating that the serving MSC supports a subset of triggers, then the HLR includes in the Return Result message, the Trigger Address List parameter containing the service triggers supported by the MSC. However, if the REGNOT Invoke message did not contain a WINCAP parameter, then no Trigger Address List parameter is included in the REGNOT Return Result. At 29, the MSC offers basic services to the MS.

Figure 3:
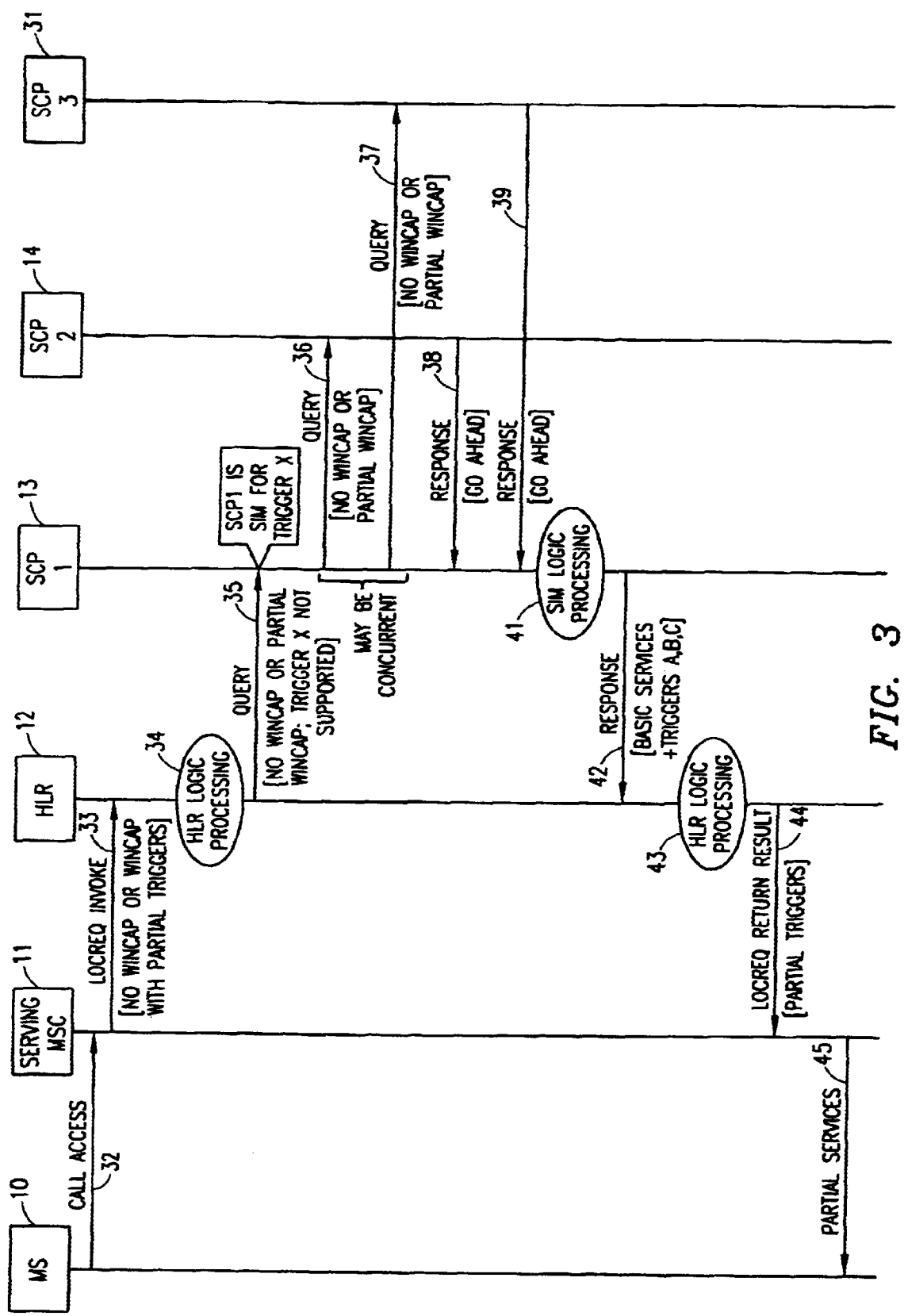
FIG. 3 is a message flow diagram illustrating the steps of the method of the present invention in the context of call setup when a Service Control Point (SCP) includes a Service Interaction Manager (SIM) that collects multiple responses and returns an appropriate response to the HLR.

FIG. 3 is a message flow diagram illustrating the steps of the method of the present invention in the context of call setup when a Service Control Point (SCP) includes a Service Interaction Manager (SIM) that collects multiple responses from other service logic entities (such as other SCPs) and returns an appropriate response to the HLR. This architecture is particularly applicable when multiple services are supported by one trigger that is not supported by the MSC. When queried for a given trigger, the SIM queries any other node providing one of the associated services, collects all the responses, and determines what type of response to send back to the HLR. For HLR-based SIMs, the HLR itself is the entity associated with the trigger, and acts as the SIM, querying all associated nodes directly and collecting and collating the response to be sent to the MSC. FIG. 3 also illustrates that the method of the present invention is applicable to scenarios other than mobile station registration. In particular, the method is applicable when any operation invoke message that is capable of carrying the WINCAP parameter is received in the HLR.

When the MS 10 makes a call access at 32, the serving MSC 11 sends a Location Request (LOCREQ) Invoke message 33 to the HLR 12 associated with the MS, and includes the WINCAP parameter. At 34, the HLR begins its logic processing to determine how to handle this call access. In the illustrated example, the subscriber profile in the HLR indicates that the subscriber has services built on WIN triggers that are not supported by the MSC capabilities reported in the WINCAP parameter. In particular, Trigger X is not supported. From the WIN trigger profile, the HLR has the addresses of the SCPs that are associated with each trigger, and determines that SCP1 (13) is associated with Trigger X. The HLR then sends a Query message 35 to SCP1 indicating that Trigger X is not supported.

In the illustrated example, Trigger X is associated with multiple services. SCP1 acts as a SIM for Trigger X, and is responsible for querying any other node providing one of the associated services, collecting all the responses, and determining what type of response to send back to the HLR. Therefore, SCP1 sends a first Query 36 to SCP2 (14) and a second Query 37 to SCP3 (31). The Query messages include the WINCAP parameter as received by the HLR from the MSC, and may be sent concurrently by SCP1. Either SCP2 or SCP3 may be the first to respond to the Query. In this example, SCP2 responds to SCP1 at 38 indicating that service logic allows this service to be skipped, and providing a "go-ahead" approval to provide basic services to the MS.

SCP3 returns a response 39 also indicating approval to provide basic services to the MS.

At 41, SIM logic processing in SCP1 collates the responses from the other SCPs and may perform, for example, a simple AND function to determine what response to provide to the HLR. The response message 42 may indicate that basic services plus triggers supported in the MSC are to be allowed. At 43, the HLR logic processing formulates a response based on the information received from the SIM SCP (SCP1). This is indicated to the serving MSC in a LOCREQ Return Result message 44. At 45, the MSC offers services to the MS as indicated by the HLR.

Since the present invention involves additional call setup signaling, there is a possibility that preset timers in various nodes could expire. For example, the MSC 11 may send a REGNOT Invoke message to the HLR 12, and the REGNOT timer in the MSC could expire before the HLR has time to query all the SCPs, collect all the responses, determine an appropriate response, and send the response to the MSC. Several options may be utilized to resolve this situation:

(1) The MSC may extend the timer.
(2) The HLR may send the MSC a Reset Timer message to extend the MSC timer.
(3) The HLR may send the MSC a REGNOT Return Result message allowing basic services (call origination and termination), but with an indication that the MSC should wait for a second response for the WIN triggers. Once all the SCPs have been queried, the HLR may then send a Qualification Directive (QUALDIR) Invoke message to the MSC indicating which WIN triggers should be armed, or alternatively, revoking the permission to allow basic services.
(4) The HLR may send the MSC a REGNOT Return Result message indicating that the REGNOT transaction should be closed to avoid timeout, but that the MSC should await a QUALDIR message to know what services to allow to the subscriber.

Figure 4:
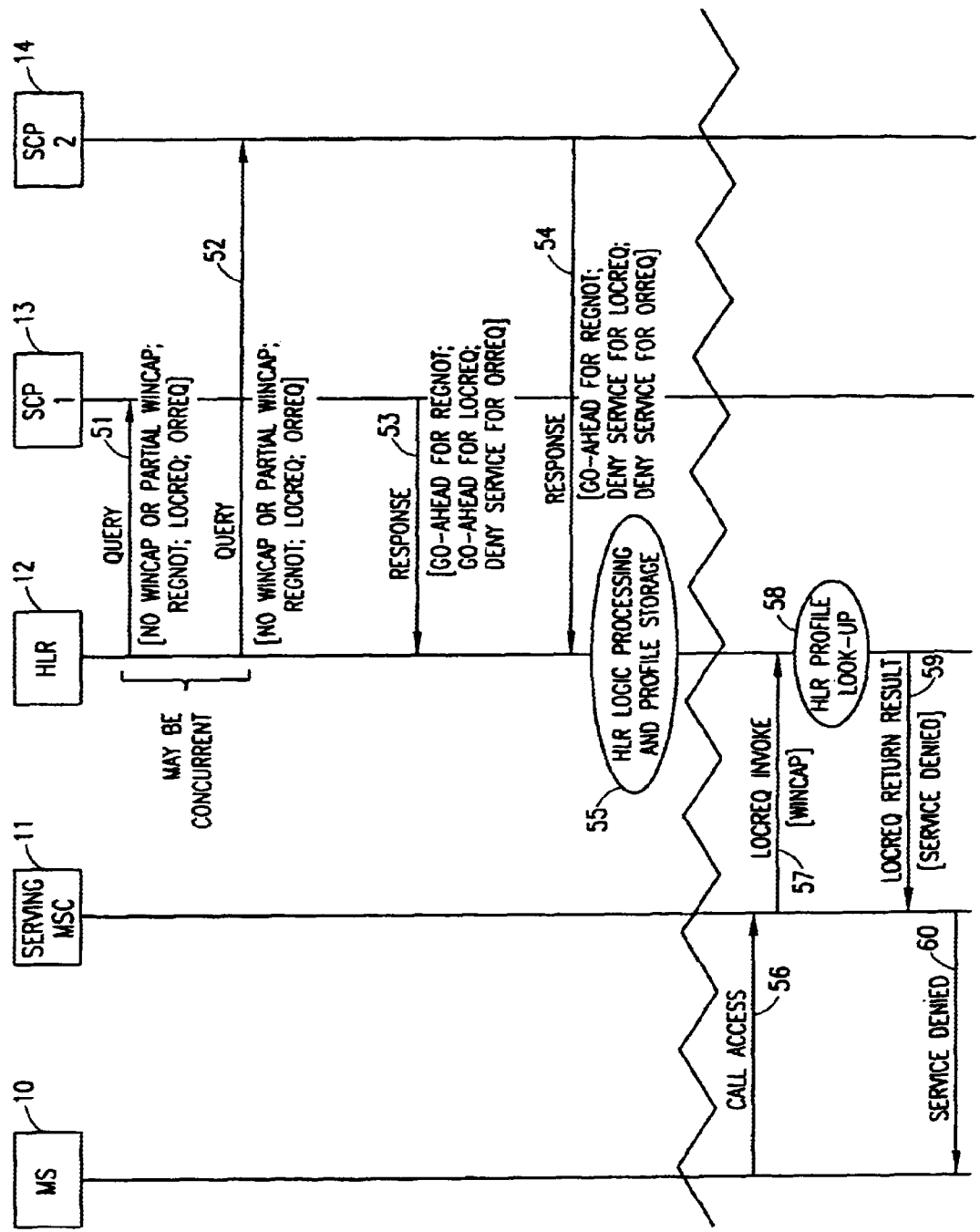
FIG. 4 is a message flow diagram illustrating the steps of an alternative embodiment of the method of the present invention.

FIG. 4 illustrates an alternative embodiment of the present invention that may be utilized to achieve the same results while avoiding potential timer problems. In this embodiment, the HLR 12 queries the SCPs 13 and 14 in advance and stores the responses to various WIN capabilities that may be reported by different MSCs. The HLR then uses one of these "canned" responses when an operation invoke message is received, and the message contains a WINCAP parameter matching the parameters of the canned response.

At steps 51 and 52, the HLR 12 anticipates receiving an invoke message from an MSC, and sends a series of Query messages to SCP1 and SCP2, and includes various WINCAP parameters in each Query. The HLR may also send a Query indicating no WIN capabilities on the part of the invoking MSC. In addition, the Query messages may indicate whether the anticipated invoke message is a REGNOT message, a LOCREQ message, or an Origination Request (ORREQ) message since the SCPs may return different treatment for different types of invoke operations. The Query messages may be sent concurrently during idle time when the HLR is not processing a registration attempt or a call for a particular subscriber.

At 53, SCP1 returns a response and indicates, for example, go-ahead and allow services if the invoke message is a REGNOT or a LOCREQ invoke message, but deny service if the invoke message is an ORREQ invoke message. At 54, SCP2 may return a response that indicates go-ahead and allow services if the invoke message is a REGNOT, but deny service if the invoke message is a LOCREQ invoke message or an ORREQ invoke message. At 55, the HLR logic processing then determines the HLR's response to the MSC for each combination of WINCAP and message type, and stores these responses in the HLR. As before, the HLR will generally select the strictest response. The HLR may repeat this process for the most typical WINCAP values.

At some later time, MS 10 makes a call access at 56. The serving MSC 11 sends a LOCREQ Invoke message 57 to the HLR 12 and includes the WINCAP parameter. The HLR checks its database at 58 and finds that it has a stored response for the WINCAP/LOCREQ combination. With such information stored at the HLR, the HLR can provide a quick response to the MSC without further querying the SCPs. Therefore, the HLR sends a LOCREQ Return Result message 59 to the serving MSC and includes an indication that service should be denied (the strictest response received earlier from the SCPs). Subsequently, the MSC denies service to the MS at 60. The call may then be routed to an announcement or the operator.

It is thus believed that the operation and construction of the present invention will be apparent from the foregoing description. While the method shown and described has been characterized as being preferred, it will be readily apparent that various changes and modifications could be made therein without departing from the scope of the invention as defined in the following claims.

What is claimed is:

1. A method in a Wireless Intelligent Network (WIN) of handling subscriber services when a serving Mobile Switching Center (MSC) does not support all WIN triggers, said WIN including a Home Location Register (HLR) having a subscriber profile that indicates the WIN triggers required to support a particular subscriber's active WIN services, said method comprising the steps of:

sending from the MSC to the HLR, an indication of the WIN triggers supported by the MSC;

identifying by the HLR, the WIN triggers in the profile that are not supported by the MSC;

identifying for each WIN trigger in the profile that is not supported by the MSC, an associated service-providing entity in the network;

querying each identified service-providing entity by the HLR for call-treatment instructions;

sending call-treatment instructions from the service-providing entities to the HLR;

determining by the HLR, a call-treatment response; and sending the call-treatment response to the MSC.

2. The method of handling subscriber services of claim 1 wherein the step of sending an indication of the WIN triggers supported by the MSC from the MSC to the HLR includes sending a WIN capabilities parameter in a Registration Notification Invoke message during registration of a mobile station.

3. The method of handling subscriber services of claim 1 wherein the step of sending an indication of the WIN triggers supported by the MSC from the MSC to the HLR includes sending a WIN capabilities parameter in a Location Request Invoke message during call setup for a mobile station.

4. The method of handling subscriber services of claim 1 wherein the step of sending an indication of the WIN triggers supported by the MSC from the MSC to the HLR includes sending a WIN capabilities parameter in an Origination Request Invoke message during call setup for a mobile station.

5. The method of handling subscriber services of claim 1 wherein the step of querying each identified service-providing entity by the HLR for call-treatment instructions includes concurrently sending a plurality of queries to a plurality of identified Service Control Points (SCPs).

6. The method of handling subscriber services of claim 1 further comprising, after the step of querying each identified service-providing entity by the HLR for call-treatment instructions, the steps of:

determining in each service-providing entity, whether its associated unsupported service is an essential service;

preparing in each service-providing entity, call-treatment instructions to allow a reduced set of services upon determining that its associated unsupported service is not an essential service; and preparing in each service-providing entity, call-treatment instructions to deny service upon determining that its associated unsupported service is an essential service.

7. The method of handling subscriber services of claim 6 wherein the step of determining a call-treatment response by the HLR includes the steps of:

comparing the call-treatment instructions received from each service-providing entity; and selecting the strictest call-treatment instruction.

8. A method in a Wireless Intelligent Network (WIN) of handling subscriber services when a serving Mobile Switching Center (MSC) does not support a particular WIN trigger (Trigger X) which supports a plurality of WIN services, said WIN including a Home Location Register (HLR) having a database that associates WIN triggers with Service Control Points (SCPs), and a first SCP (SCP1) having a Service Interaction Manager (SIM) for Trigger X, said method comprising the steps of:

sending from the MSC to the HLR, an indication that the MSC does not support Trigger X;

identifying SCP1 by the HLR as the SCP associated with Trigger X;

querying SCP1 by the HLR for call-treatment instructions;

identifying by SCP1, an SCP associated with each of the plurality of WIN services supported by Trigger X;

querying each identified SCP by SCP1 for call-treatment instructions related to each SCP's associated WIN service;

sending call-treatment instructions from each SCP to SCP1;

determining by SCP1, a call-treatment response;

sending the call-treatment response from SCP1 to the HLR; and sending the call-treatment response from the HLR to the MSC.

9. The method of handling subscriber services of claim 8 further comprising, after the step of querying each identified SCP by SCP1 for call-treatment instructions, the steps of:

determining in each SCP, whether its associated WIN service is an essential service;

preparing in each SCP, call-treatment instructions to allow a reduced set of services upon determining that its associated unsupported service is not an essential service; and preparing in each SCP, call-treatment instructions to deny service upon determining that its associated unsupported service is an essential service.

10. The method of handling subscriber services of claim 9 wherein the step of determining a call-treatment response by SCP1 includes the steps of:

comparing the call-treatment instructions received from each SCP; and selecting the strictest call-treatment instruction.

11. A method of handling subscriber services in a Home Location Register (HLR) in a Wireless Intelligent Network (WIN), said WIN including a plurality of Mobile Switching Centers (MSCs) that support varying numbers of WIN triggers, and an HLR having a subscriber profile that indicates WIN triggers required to support a particular subscriber's active services, said method comprising the steps of:

storing in a database in the HLR, a plurality of call-treatment responses, each of said responses being associated with a different set of WIN triggers;

receiving from one of the MSCs in the network, an indication of the set of WIN triggers that are supported by the MSC;

identifying by the HLR, a stored call-treatment response associated with the set of WIN triggers that are supported by the MSC; and sending the identified call-treatment response to the MSC.

12. The method of handling subscriber services of claim 11 wherein the step of storing a plurality of call-treatment responses in a database in the HLR includes the following steps performed in the HLR:

identifying for each WIN trigger required to support a subscriber service, an associated service-providing entity in the network;

querying each identified service-providing entity for call-treatment instructions;

receiving the call-treatment instructions from the service-providing entities;

determining a call-treatment response; and storing the call-treatment response in the database in the HLR.

13. The method of handling subscriber services of claim 12 wherein the step of storing a plurality of call-treatment responses in a database in the HLR is performed by the HLR prior to receiving an invoke message from the MSC that includes the indication of the set of WIN triggers that are supported by the MSC.

14. A method of handling subscriber services in a Home Location Register (HLR) in a Wireless Intelligent Network (WIN), said WIN including a plurality of Mobile Switching Centers (MSCs) that support varying numbers of WIN triggers, and an HLR having a subscriber profile that indicates the WIN triggers required to support a particular subscriber's active services, said method comprising the steps of:

receiving in the HLR, an indication of the WIN triggers supported by the MSC;

identifying by the HLR, the WIN triggers in the profile that are not supported by the MSC;

identifying by the HLR, a service-providing entity in the network associated with each WIN trigger in the profile that is not supported by the MSC;

querying each identified service-providing entity by the HLR for call-treatment instructions;

receiving in the HLR, call-treatment instructions from the service-providing entities;

determining by the HLR, a call-treatment response; and sending the call-treatment response to the MSC.

* * * * *